Feb. 8, 1927.
J. RACHFORD
1,616,868
SAUSAGE LINKING MACHINE
Filed April 25, 1924   6 Sheets-Sheet 3
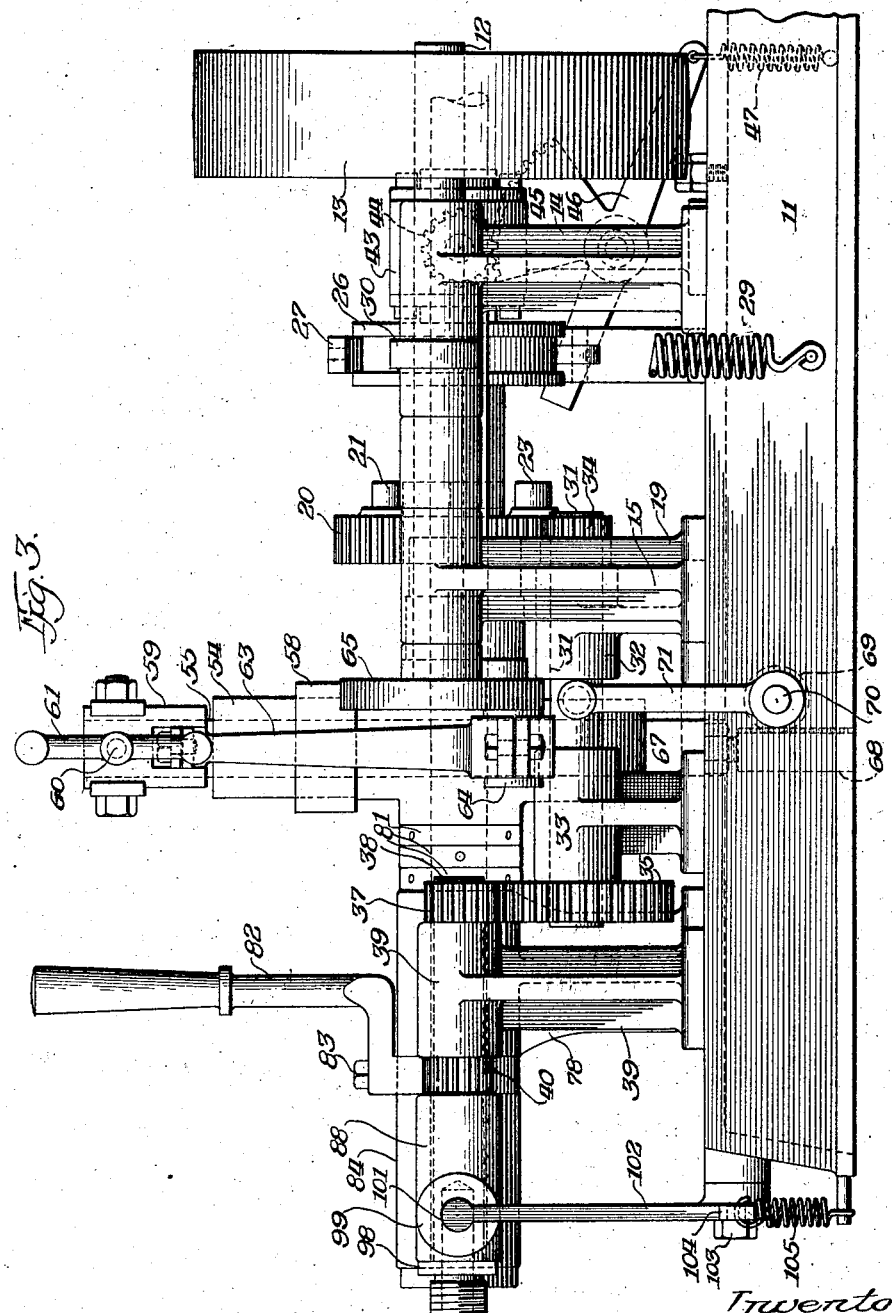

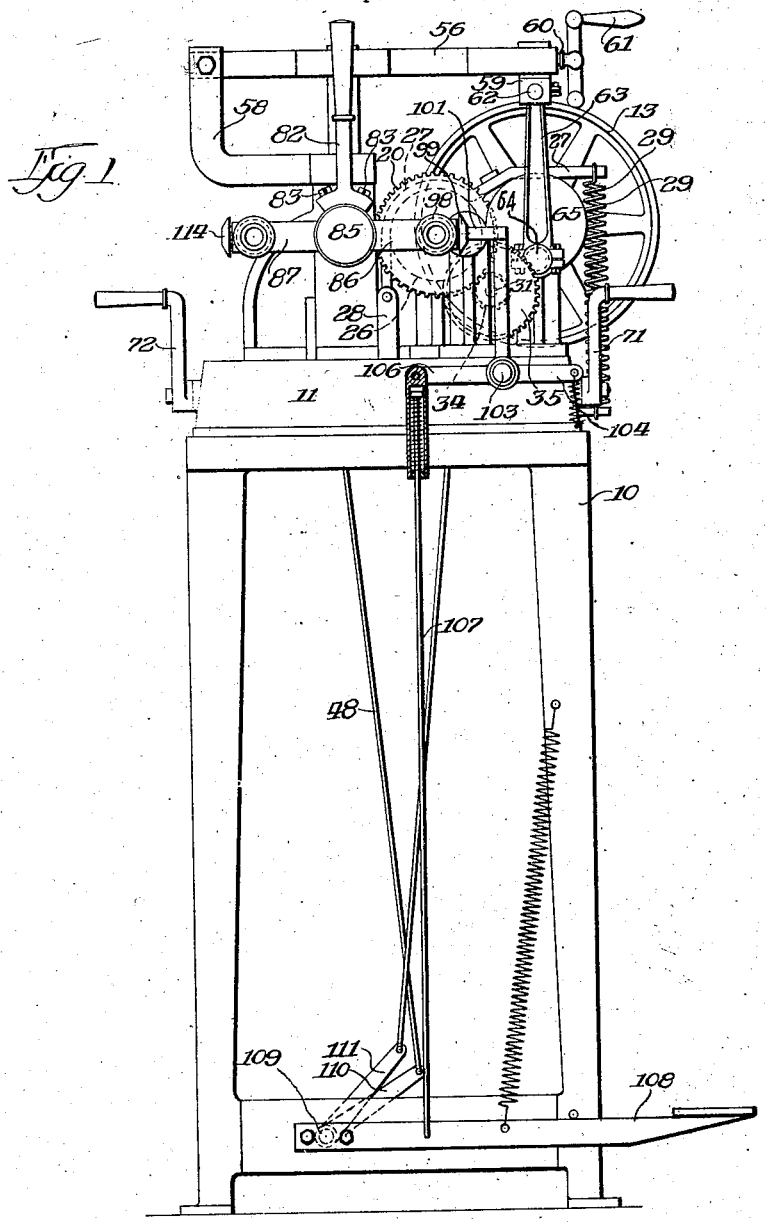

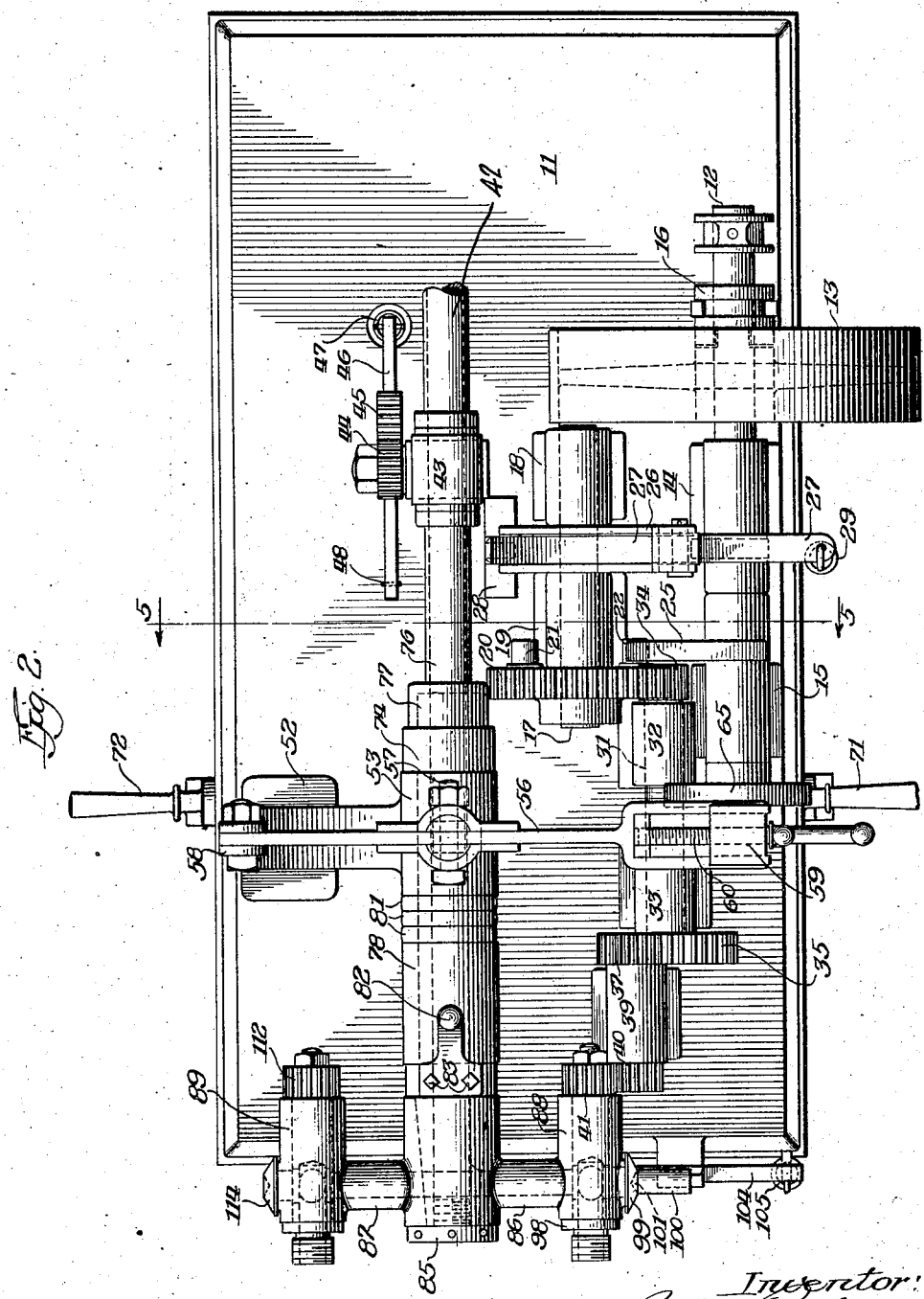

Feb. 8, 1927. 1,616,868
J. RACHFORD
SAUSAGE LINKING MACHINE
Filed April 25, 1924 6 Sheets-Sheet 4
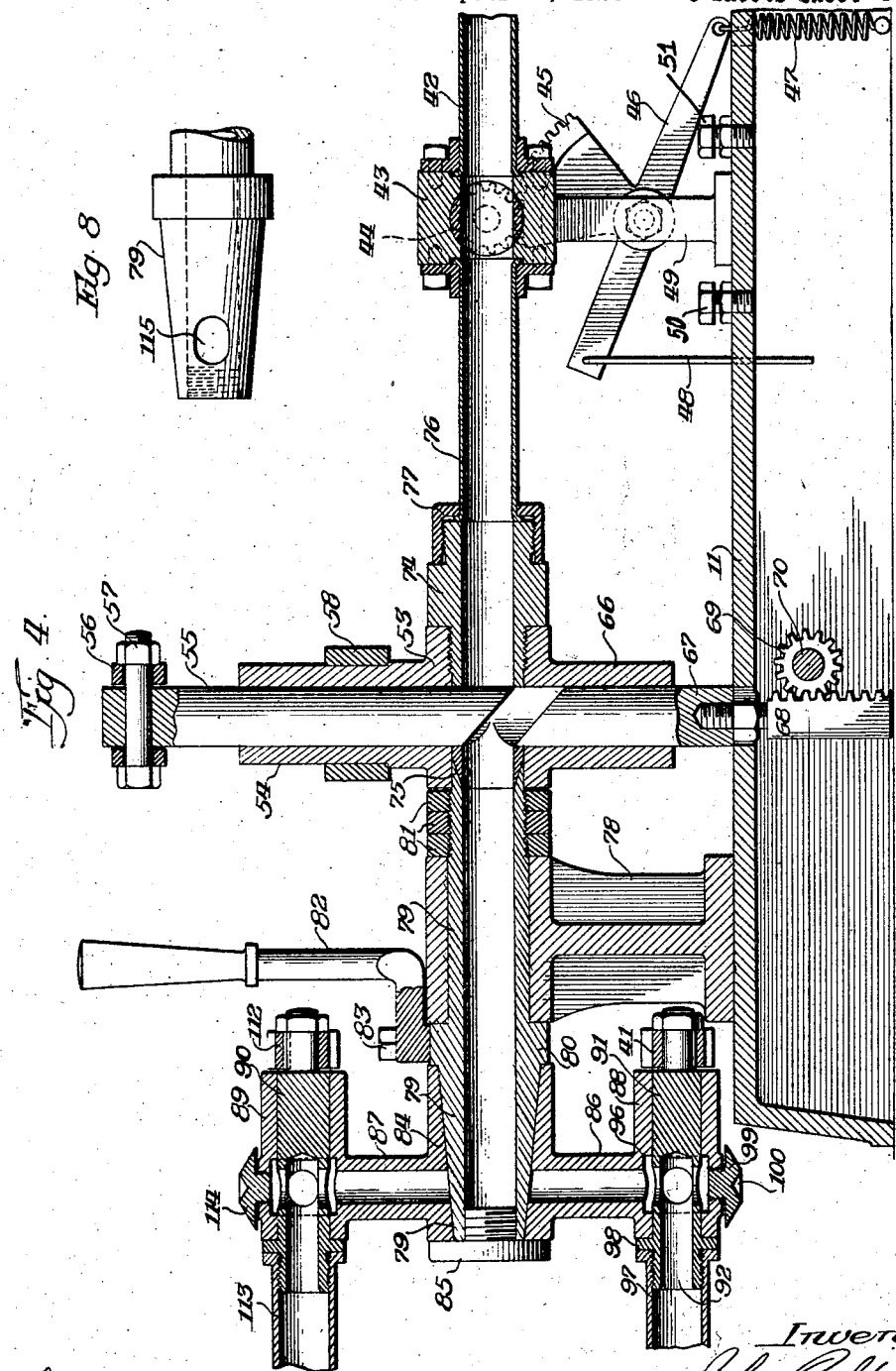

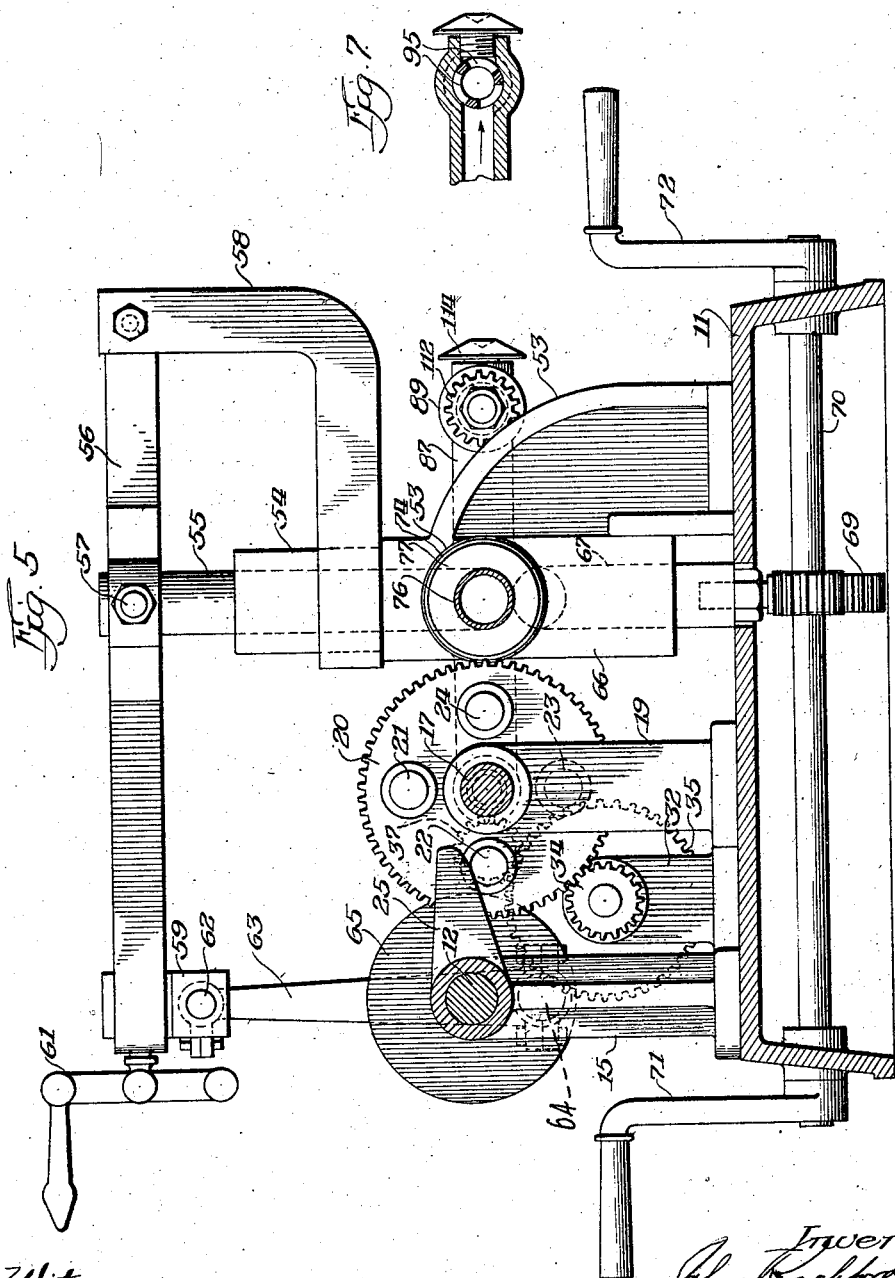

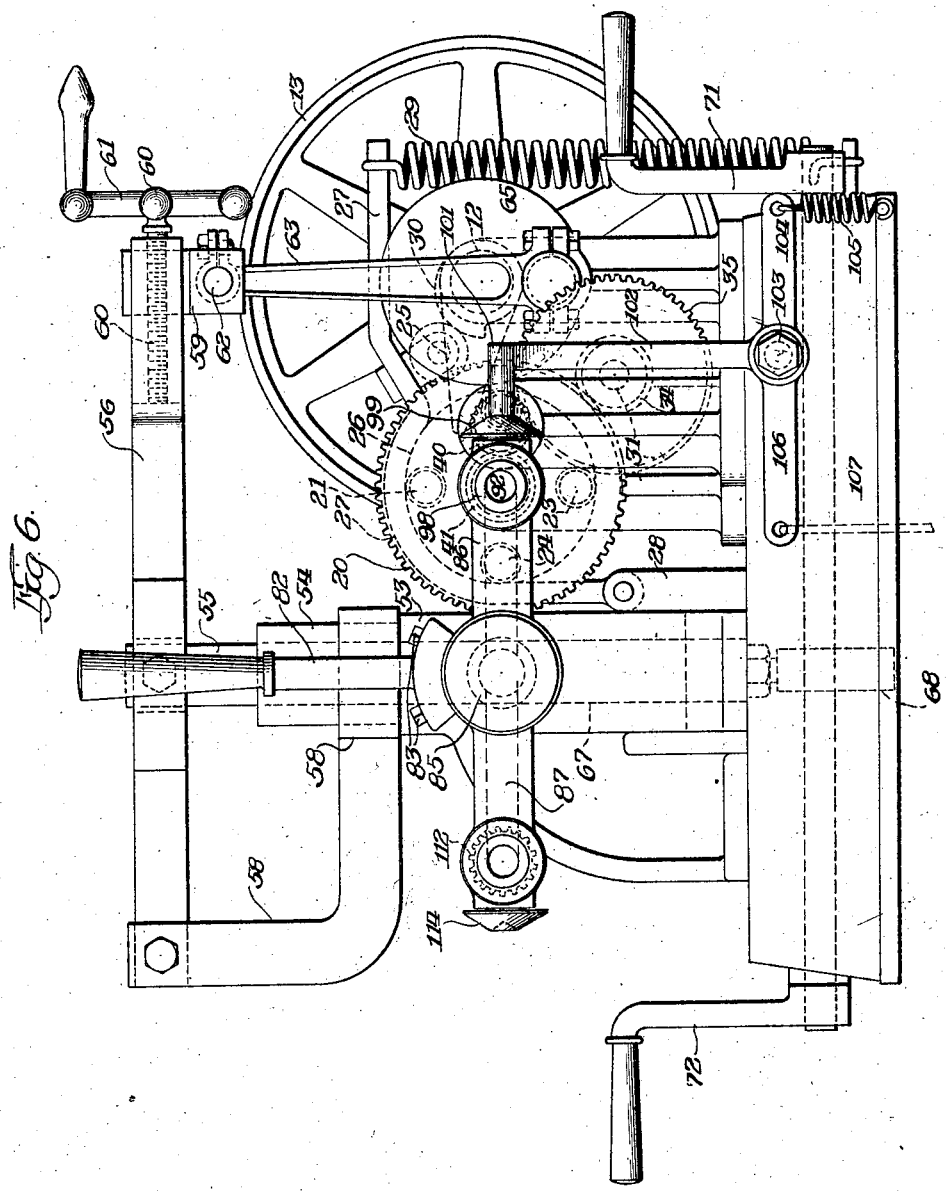

Patented Feb. 8, 1927.

1,616,868

UNITED STATES PATENT OFFICE.

JOHN RACHFORD, OF CHICAGO, ILLINOIS.

SAUSAGE-LINKING MACHINE.

Application filed April 25, 1924. Serial No. 708,963.

My invention relates to a sausage stuffing and linking machine and has for its primary object the provision of a machine which is particularly adapted to stuff sausage into casings and link the casings by twisting them during the stuffing operation, the operation of the machine being momentarily stopped while the twisting operation takes place.

Another object of my invention is the provision of a sausage stuffing machine wherein the quantity of sausage meat which is put into the casing is controlled by the operator, regardless of the size of the casings within which the sausage meat is stuffed.

Another and further object of my invention is the provision of a machine wherein the stuffing operation can be carried on very rapidly because I provide a double stuffing head having a pair of stuffing tubes attached thereto so that while a casing is being filled with one of these tubes, another casing can be placed upon the adjacent tube and the head turned when the first casing is filled so that the second stuffing tube is brought into such position that the stuffing can be continued while a new casing is placed upon the first tube.

Another and further object of my invention is the provision of a sausage stuffing machine wherein the machine can be so adjusted that the compactness of the meat in the casing can be controlled so that the sausage casings are full, firm and completely filled and thus produce superior appearing and more uniform sausages, a condition which is much sought for in the trade.

Another and further object of my invention is the provision of a sausage stuffing machine which is simple in operation and which can be readily assembled and which is compact in use.

These and other objects of my invention will be better and more fully understood with reference to the drawings wherein—

Figure 1 is a front end elevational view of my improved machine;

Figure 2 is a plan view of my improved machine;

Figure 3 is a side elevational view of the operating parts of my machine;

Figure 4 is a longitudinal sectional view taken on an axial line through the meat supply tube of my improved machine;

Figure 5 is a transverse sectional view on line 5—5 of Figure 2;

Figure 6 is an elevational view of the front end of the machine showing the operating parts thereof;

Figure 7 is a detailed view showing one of the filling tubes and a centering device by means of which the rotatable head is properly positioned; and Figure 8 is a detail view showing the discharge portion of the sizing tube.

Referring now specifically to the drawings, in which like reference characters refer to like parts throughout, a frame 10 is shown having a base 11 at the top thereof upon which the operating parts of the machine are mounted. A power shaft 12 is provided having a belt wheel 13 mounted thereon, the said shaft being mounted within a pair of bearings 14 and 15 which are secured to the base 11 in any approved manner. A clutch 16 is provided by means of which the belt wheel 13 is disengaged from the power shaft 12 which is common with machines of this character for throwing the machine into and out of gear and which is controlled by a foot pedal hereinafter described. Extending parallel to the shaft 12 and spaced a short distance therefrom is a short transmission shaft 17 which is secured to the base 11 by a pair of spaced bearings 18 and 19, and which has mounted upon it at its forward end, a gear wheel 20 having a plurality of spaced pins 21, 22, 23 and 24 thereon which project outwardly from the side of said gear wheel 20, each of the pins having rollers mounted thereon to reduce the friction as the gear wheel 20 is turned by the operation of the power shaft, hereinafter described. An arm 25, fixedly mounted upon the power shaft 12, projects inwardly adjacent the gear wheel 20 and engages successively the pins 21, 22, 23 and 24, as the arm 25 is rotated by the motion of the power shaft 12, thus moving the gear wheel 20 one-quarter of a turn with each revolution of the power shaft 12. Also mounted upon the shaft 17 is a clutch or brake wheel 26 having a circumferential groove in the outer periphery thereof within which a co-operating arm or brake member 27 is positioned, the inner end of this brake member being pivotally mounted upon a bracket 28 secured to the base 11 of the machine and the outer end is carried outward and has a spring 29 secured thereto, the lower end of which is fastened to the base plate 11 of the machine. A cam 30 is mounted upon the power shaft 12 and is in normal engagement with the arm 27, the purpose of this cam being to raise the arm 27 so that the brake is released in proper timing relation with the turning movement given to the gear wheel 20 by the member 25, and further insuring that immediately one of the pins on the wheel 20 is carried out of the path of the arm 25, further movement of the gear 20 being prevented.

A transmission shaft 31 is provided which is mounted within a pair of spaced bearings 32 and 33 and which are secured to the base plate 11 in any approved manner, the said shaft at one of its ends having a gear wheel 34 mounted thereon which is in mesh with the gear wheel 20. At the opposite end of the shaft 31 is another gear wheel 35 which engages with a second gear wheel 37 which is mounted upon a short transmission shaft 38 which is mounted upon a bearing 39 secured to the base plate 11 and which has a gear wheel 40 mounted on its front end which meshes with a gear wheel 41 mounted upon the rear end of one of the twister tubes as will be hereinafter described in detail, the mechanism just described forming the means by which the casings are twisted to form the links during the filling operation of the casings.

A meat supply tube 42 is provided leading to any suitable source of meat supply and has mounted therein a control valve 43 which is operated by a gear wheel 44 which meshes with a segmental gear 45 to which an operating arm 46 is secured. Upon one end of the arm 46 is positioned a spring 47 and at the opposite end of said arm is a pull rod 48, the arm 46 being mounted upon a bracket 49 secured to the base plate 11 of the machine which also supports the meat supply tube 42 and the valve 43. The spring 47 normally holds the valve 43 in closed position and is opened by the operator pressing the foot control apparatus to which the valve is attached by means of the pull rod 48 as will be described hereinafter. A pair of adjustable stop bolts 50 and 51 are provided against which the control arm 46 abuts so that the degree of opening of the valve 43 can be controlled.

A bracket 52 is mounted upon the base plate 11 and has a valve housing 53 mounted at the upper end thereof. The valve housing 53 has an upwardly extending portion 54 within which a valve member 55 is mounted which is secured to an operating arm 56 by means of a bolt 57. The arm 56 is pivotally mounted at one of its ends to a bracket 58 which is secured to the valve housing 53 so as to allow for pivotal movement of the arm 56 and which at its opposite end is bifurcated and has a block 59 mounted therein by means of a screw 60 having a handle 61 at the outer end thereof by means of which the block 59 is moved to different positions in the bifurcated end of the arm 56, thus varying the distance of travel of the valve 55. Secured to the block 59 by means of a pin 62 is a crank arm 63 which is mounted upon a wrist pin 64 carried by a disk 65 which is mounted on the forward end of the power shaft 12 and through which motion is communicated to the valve 55 which automatically shuts off the flow of meat to the casing during the twisting of the casing to form the links. It will be noted that the lower face of the valve member 55 is angularly disposed with the sloping face of said valve presented towards the front end of the machine so that as the valve 55 is reciprocated in the valve housing, an additional quantity of meat is forced on through the filling tube, the purpose of this valve being to shut off the flow of meat into the casing and also to force a slightly additional quantity of meat into the casing just before the twisting operation takes place so as to insure the casing being filled completely and to give the sausage a plump and tightly drawn appearance of the casing desired in the trade. The valve housing 53 has a lower projecting portion 66 having an upwardly operating valve member 67 mounted thereon which is secured to a rack 68 operated by a gear wheel 69 mounted upon a shaft 70 which extends transversely through the base 11 and has a hand crank 71 at one side thereof with a similar crank 72 at the opposite side thereof, the purpose of this valve member being to shut off the supply of sausage meat by hand for straight filling operations as will be more fully described hereinafter or for operating auxiliary to the valve 43 if for any reason this valve should fail to work properly.

Carried by the valve housing 53 is a short section of tube 74 which is in threaded engagement with the valve housing 53 and at its front end has a tapered end 75. A short pipe section 76 is provided which is connected to the pipe section 74 by means of a gland 77 and which extends from the valve 43 forming part of the meat supply pipe through which the sausage is supplied to the filling tubes. A bracket 78, secured to the base 11, is provided within which a sizing tube 79 is rotatably mounted, the rear end of the sizing tube having a tapered joint and cooperating with the tapered end 75 on the tube 74. The said sizing tube has an annular ring 80 thereon which forms an abutting shoulder which cooperates with the side of the bracket 78, the said tubing having a plurality of locking rings 81, 81 in threaded engagement with the said sizing tube at the rear end thereof so as to frictionally engage against the rear side of the bracket 78 and prevent the turning of the sizing tube except by the will of the operator. A handle 82 is secured to the sizing tube 79 by bolts 83, 83, the said sizing tube at the front end thereof having a rotatably mounted filler head 84. The filler head 84 is secured in position upon the sizing tube by a locking cap 85 in internally threaded engagement with the sizing tube 79. The filler head 84 has a pair of tubular, outwardly extending portions 86 and 87 with head portions 88 and 89 at the outer ends thereof within which twister tubes 90 and 91 are mounted. The said twister tube 91 has a gear wheel 41 secured thereto as heretofore described and has a central bore 92 in the forward end thereof with a plurality of openings 95, 95 in the side walls adjacent the opening through the tube 86 within which a recess 96 is formed providing an annular space around the rear portion of the bore 92 and adjacent the openings 95 therethrough the sausage meat will readily pass into the twister tube 91, regardless of whether one of the openings 95 is in exact register with the passages through the portions 86 or 87. A casing tube 97 is provided upon which the casing is positioned during the filling operation and which is in screw-threaded engagement with the twister tube 91. An angular shoulder 98 is provided upon the twister tube 91 so that this tube is prevented from entering the portion 89 of the stuffing head 84. On the outer side of the portion 88 is a nut 99 in screw-threaded engagement with the portion 88 of the twister head 84 and having a recess 100 in the center of the said nut 99 within which a pin 101 mounted upon the end of a T-shaped crank arm 102 is adapted to be positioned, the said arm being pivotally mounted to the base plate 11 by means of a bolt 103. One portion 104 of the arm 102 extends outwardly from the bolt 103 and has a spring 105 secured to the outer end thereof which normally holds the pin 101 out of engagement with the centering nut 99. Extending in opposite directions from the portion 104 is a member 106 to which a pull rod 107 is secured, the said pull rod extending to a foot pedal 108 mounted at the bottom of the machine and extending outwardly from the frame of the said machine and through which the operator controls the operation of the machine. The pedal 108 is secured to a shaft 109 mounted upon the frame of the machine and has an arm 110 secured thereto to which the pull rod 48 is secured leading to the valve 43, with a second arm 111 having an operating rod extending upwardly therefrom to the clutch 16 which connects the belt wheel 13 to the power shaft 12 so that the entire operation of the machine is under the control of the operator.

The portion of the head 89 is an exact duplicate of the opposite side heretofore described with a gear wheel 112 mounted upon the rear end of the twister tube 90 to which a stuffing tube 113 is secured at its forward end and which is a duplicate of the twister tube 91 heretofore described. A centering nut 114 is provided having a recess in the end thereof within which the centering pin 101 is adapted to seat when this side of the stuffing head is in position for the stuffing operation.

The sizing tube 79 has a discharge opening 115 therein on the side adjacent the power transmission members so that meat therefrom is discharged at one side only of this tube as shown in Figure 8. This opening 115 is slightly elongated so as to allow for quick passage of the sausage meat therethrough to the stuffing head adjacent the side of the opening 115. The machine may also be adapted for straight stuffing such as bologna and the like, by removing the cap 85 and attaching directly to the sizing tube a stuffing tube and then turning the stuffing head 84 into vertical position so that neither of the twister tubes are in engagement with the gear wheel 40 so that where a small manufacturer does not desire to purchase two machines for stuffing operation, the machine is capable of conjoint use for straight stuffing and also for making link sausage. It will also be understood that the sizing tube is rotatably mounted in the bracket 78, and that the operator, by turning the sizing tube to different positions by means of handle 82 so as to bring the discharge opening 115 into complete registry or partial registry with the passages through the portions 86 or 87, can control the quantity of sausage meat, as for instance, when the first link is made, if he finds the link is too long, the sizing tube is turned so that the discharge opening 115 is slightly out of register with the opening in the portions 86 or 87 so that the quantity of meat passing out of this discharge opening is decreased and shorter links are formed. In the sale of sausage of this character, it is highly important to have a predetermined number of links to the pound so that if a customer wishes to purchase a pound, this quantity can be sold without the necessity of breaking one of the links.

In the operation of the device, sausage casings are placed upon stuffing tubes 97 and 113 and the filling head is turned by hand to a horizontal position; the operator thereupon presses the pedal 108 down first and causes the pin 101 to engage in the recess 100, thus centering the head in proper relation so that the gear wheels 40 and 41 are properly meshed. The clutch 16 is brought into engagement with the power wheel 13 and thereafter the meat valve 43 is opened allowing the flow of meat through the meat tube into the sausage casing carried by the tube 97 mounted upon the twister tube 91. As soon as the power shaft 12 makes one rotation, the arm 25 engages one of the pins in the gear wheel 20, the brake 27 being released by the cam 30 so that through the train of gears the twister tube 91 is given the required number of turns to one rotation of the power shaft 12, and thus twisting the casing so that the first link of sausage is formed. Just before the twisting operation is performed, the valve member 55 is closed, thus cutting off the flow of meat through the meat tube and because of the angular shape of the valve member, a small quantity of heat is pushed outward into the sausage casing to compensate for any loss in the casing due to elasticity of the meat and causing a slight set in the meat, insuring a completely filled casing, the degree of closure of the valve controlling the additional quantity of meat which is forced into each link, this control being accomplished by adjustment of the block 59 in the end of the arm 56.

As soon as the twisting operation is complete, the valve 55 is opened by the operation of the arm 56 and the operation heretofore described continued until the casing is completely filled. As soon as one casing is filled, the operator releases the foot pedal which first closes the valve 43, then releases the clutch and then the centering device, whereupon the operator rotates the head 87 until the opposite twister tube is in proper position when the same sequence of operations described above is continued, the helper in the meantime having put an additional casing upon the stuffing tube which is not being used so that in this manner the capacity of the machine is very much increased by the use of the double head.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A sausage stuffing and linking machine comprising in combination a meat supply tube, a valve having an angularly disposed surface adapted to control the flow of meat through said supply tube, a casing tube connected to said supply tube, means adapted to intermittently rotate said casing tube and means to operate the said valve in synchronism with the rotation of said casing tube.

2. A sausage stuffing and linking machine comprising in combination a meat supply tube, a valve controlling the passage of meat through said meat supply tube, and twisting means, the said valve cutting off the passage of meat through said tube and forcing an additional quantity of meat into the casing tubes.

3. A sausage stuffing and linking machine comprising in combination a meat supply tube, a rotatable stuffing head associated with said tube and adapted to receive meat from said tube in a predetermined position of said stuffing head, a valve controlling the passage of meat through the said meat supply tube, casing tubes attached to said stuffing head and power means for twisting the casing tubes after each sausage link is formed.

4. A sausage stuffing and linking machine comprising in combination a meat supply tube, a movably positioned sizing tube associated therewith, a movable stuffing head mounted upon said sizing tube, casing tubes carried by the said stuffing head, a valve located in said meat supply tube and means whereby the said valve and said casing tubes are operated in synchronism with each other.

5. A sausage stuffing and linking machine comprising in combination a meat supply tube, a valve located in said tube, a sizing tube in axial relation with said meat supply tube having a discharge opening in one side thereof, a rotatably mounted stuffing head, a plurality of casing tubes rotatably mounted thereon, means for rotating said casing tubes and means for operating said meat control valve in synchronism with said rotating means.

6. A sausage stuffing and linking machine comprising in combination a meat supply tube, a sizing tube in axial relation with said meat supply tube and movable relatively thereto, said sizing tube having a discharge opening in one of its sides, a stuffing head rotatably mounted on said sizing tube and having a plurality of passages therein, a plurality of rotatably mounted casing tubes carried by the said stuffing head, means for rotating said tubes at predetermined times and a valve controlling the supply of meat passing through the said meat supply tube, the said valve being operated in synchronism with the means for rotating the said casing tubes.

7. A sausage stuffing and linking machine comprising in combination a meat supply tube, a sizing tube connected to said meat supply tube and having a discharge opening in one side thereof, a stuffing head having a plurality of passages therein, a plurality of rotatably mounted casing tubes mounted upon said stuffing head, gear wheels connected to said rotatably mounted tubes, a train of power driven gears adapted to impart rotary motion to said tubes intermittently, means for holding the gear wheels on one of said rotatably mounted tubes in engagement with said train of gears.

8. A sausage stuffing and linking machine comprising a meat supply tube, a movably mounted sizing tube connected to said meat supply tube having a discharge opening in one of its sides, a stuffing head having a plurality of passages therein rotatably mounted upon said sizing tube, rotatably mounted stuffing tubes carried by said stuffing head, a power driven shaft, gear connections adapted to operate intermittently to impart a rotary movement to said stuffing tubes, a valve in said meat supply tube and operative connections between said valve and said power driven shaft whereby the flow of meat passing through said meat supply tube is stopped during the rotation of the said stuffing tubes.

9. A sausage stuffing and linking machine comprising in combination a meat supply tube, a movably mounted sizing tube connected to said meat supply tube having a discharge opening in one of the sides, a stuffing head having a plurality of passages therein rotatably mounted upon said sizing tube, rotatably mounted stuffing tubes carried by said stuffing head, a power driven shaft, gear connections adapted to operate intermittently, thereby imparting a rotary movement to said stuffing tubes, a valve in said meat supply tube, operative connections between said valve and said power driven shaft whereby the flow of meat passing through said meat supply tube is stopped during the operation of said twisting tubes, and braking and locking means adapted to hold said gear connections in predetermined positions when the twisting tubes are held in non-rotatable position.

10. A sausage stuffing and linking machine comprising in combination a meat supply tube, a valve in said meat supply tube comprising a pair of members having diagonally disposed co-operating surfaces, casing tubes connected to said supply tube, means adapted to intermittently rotate said casing tubes, and means for operating said valve in synchronism with the rotation of said casing tubes.

11. A sausage stuffing and linking machine comprising in combination a meat supply tube a valve controlling the passage of meat through said supply tube, and having a pair of movable members having diagonally disposed co-operating surfaces, one of said members being movable to intermittently control the flow of meat through the meat supply tube, the other member being manually operable to close the passage of meat through said supply tube, a pair of casing tubes connected to said supply tube, and means adapted to intermittently rotate said casing tubes.

12. A sausage stuffing and linking machine comprising in combination a meat supply tube, a valve operating intermittently to control the passage of meat through the said supply tube, a sizing tube connected to said meat supply tube having an opening in one side thereof, a stuffing head having a plurality of passages therein adapted to be brought into register with the opening in the sizing tube, casing tubes mounted upon said stuffing head, means adapted to intermittently rotate said casing tubes, and means adapted to operate the valve in said meat supply tube in synchronism with the twisting of the said casing tubes.

13. A sausage stuffing and linking machine comprising in combination a meat supply tube, a valve operating intermittently to control the passage of meat through the said supply tube, a sizing tube connected to said meat supply tube having an opening in one side thereof, a stuffing head having a plurality of passages therein adapted to be brought into register with the opening in the sizing tube, casing tubes mounted upon said stuffing head, means adapted to intermittently rotate said casing tubes, means adapted to operate the valve in said meat supply tube in synchronism with the twisting of the said casing tubes, and means connected to said sizing tube for controlling the relation of the opening in said sizing tube with respect to the passages in said stuffing head.

14. A sausage stuffing and linking machine comprising in combination a meat supply tube, a valve operating intermittently to control the passage of meat through the said supply tube, a sizing tube connected to said meat supply tube having an opening in one side thereof, a stuffing head having a plurality of passages therein adapted to be brought into register with the opening in the sizing tube, casing tubes mounted upon said stuffing head, means adapted to intermittently rotate said casing tubes, means adapted to operate the valve in said meat supply tube in synchronism with the twisting of the said casing tubes, a handle connected to said sizing tube whereby the relation of the passage in said sizing tube to the discharge passages in the stuffing head is controlled.

15. A sausage stuffing and linking machine comprising in combination a meat supply tube, a valve operating intermittently to control the passage of meat through the said supply tube, a sizing tube connected to said meat supply tube having an opening in one side thereof, a stuffing head having a plurality of passages therein adapted to be brought into register with the opening in the sizing tube, casing tubes mounted upon said stuffing head, means adapted to intermittently rotate said casing tubes, means adapted to operate the valve in said meat supply tube in synchronism with the twisting of the said casing tubes, and means for holding the said stuffing head in a predetermined position.

16. A sausage stuffing and linking machine comprising in combination a rotatably mounted meat supply tube having a discharge opening therein, a rotatable stuffing head having a plurality of passages therein and casing tubes mounted on said stuffing head corresponding in number to the passages in said stuffing head.

17. A sausage stuffing and linking machine comprising in combination a meat supply tube having a discharge opening in the side thereof, a rotatable stuffing head having a plurality of radially extending passages therein, casing tubes mounted on said stuffing head corresponding in number to passages in said stuffing head, means for holding the said stuffing head in a predetermined position whereby the said discharge opening in the supply tube connects with the passages in the stuffing head and means for moving the meat supply tube whereby the relation of the discharge opening therein to the passages in the stuffing head is controlled.

18. A sausage stuffing and linking machine comprising in combination a meat supply tube, a valve in said meat supply tube, a sizing tube having a discharge opening in the side thereof, a rotatable stuffing head mounted on said sizing head having a plurality of radially extending passages therein, rotatably mounted casing tubes connected to said stuffing head, means for operating the said valve in synchronism with the twisting of the said casing tubes, means for holding the said stuffing head in a predetermined position whereby the said passages are in alignment with the discharge opening in the said sizing tube, and means connected to said sizing tubes whereby the degree of register of said opening with respect to the passages in said stuffing head is controlled.

19. A sausage stuffing machine comprising in combination a rotatably mounted meat supply tube, having a discharge opening in the side thereof, a rotatable stuffing head mounted upon said meat supply tube having a plurality of passages therein, casing tubes mounted on said stuffing head corresponding in number to the passages in said stuffing head and means whereby the discharge opening in the meat supply tube and the passages in stuffing head are adjusted with relation to each other.

20. A sausage stuffing machine comprising in combination a rotatably mounted meat supply tube, having a discharge opening in the side thereof, a rotatable stuffing head mounted upon said meat supply tube having a plurality of passages therein, casing tubes mounted on said stuffing head corresponding in number to the passages in said stuffing head and a handle secured to said meat supply tube whereby the degree of register of the discharge opening in the meat supply tube is controlled with respect to the passages in stuffing head.

Signed at Chicago, Illinois, this 21st day of April, 1924.

JOHN RACHFORD.